(12) United States Patent
Mitsui

(10) Patent No.: US 6,812,748 B2
(45) Date of Patent: Nov. 2, 2004

(54) SEMICONDUCTOR DEVICE HAVING SUBSTRATE POTENTIAL DETECTION CIRCUIT LESS INFLUENCED BY CHANGE IN MANUFACTURING CONDITIONS

(75) Inventor: Katsuyoshi Mitsui, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 0 days.

(21) Appl. No.: 10/334,005

(22) Filed: Dec. 31, 2002

(65) Prior Publication Data

US 2004/0008076 A1 Jan. 15, 2004

(30) Foreign Application Priority Data

Jul. 9, 2002 (JP) ........................................ 2002-200227

(51) Int. Cl.$^7$ ............................. H03K 5/22; H03K 5/153
(52) U.S. Cl. ..................... 327/81; 327/534; 327/536; 327/80
(58) Field of Search ............................... 327/534–537, 327/77, 78, 80, 81

(56) References Cited

U.S. PATENT DOCUMENTS

| | | | |
|---|---|---|---|
| 5,262,989 A | * 11/1993 | Lee et al. ............... | 365/189.01 |
| 5,270,584 A | 12/1993 | Koshikawa et al. ........ | 327/534 |
| 5,668,487 A | 9/1997 | Chonan ....................... | 327/80 |
| 5,721,510 A | * 2/1998 | Miyajima .................... | 327/536 |

FOREIGN PATENT DOCUMENTS

| | | |
|---|---|---|
| JP | 63-304658 | 12/1988 |
| JP | 2-37593 | 2/1990 |
| JP | 5-54650 | 3/1993 |

* cited by examiner

Primary Examiner—Terry D. Cunningham
Assistant Examiner—Quan Tra
(74) Attorney, Agent, or Firm—Burns, Doane, Swecker & Mathis, L.L.P.

(57) ABSTRACT

A VBB control circuit includes an intermediate potential generation circuit receiving a substrate potential VBB which is a negative potential and outputting a divided potential between a power supply potential INTVDD and a ground potential, and an inverter receiving the divided potential and determining whether the substrate potential is higher or lower than a desired value. A logic threshold value of the inverter is (½)×INTVDD. If a relationship of VBB=VREFB−(½)×INTVDD is satisfied, the divided potential accurately becomes (½)×INTVDD. Thereby, it is possible to realize a semiconductor device including a detection circuit which can arbitrarily select a detected potential of the VBB by changing VREFB and which is less influenced by a change in manufacturing conditions.

4 Claims, 13 Drawing Sheets

SEMICONDUCTOR DEVICE HAVING SUBSTRATE POTENTIAL DETECTION CIRCUIT LESS INFLUENCED BY CHANGE IN MANUFACTURING CONDITIONS

BACKGROUND OF THE INVENTION

1. Field of the Invention

The present invention relates to a semiconductor device, and more particularly to a semiconductor device including a substrate potential detection circuit generating a substrate potential which is a negative voltage in the semiconductor device.

2. Description of the Background Art

FIG. 10 is a block diagram showing a configuration of a conventional semiconductor device which includes a substrate potential detection circuit 502.

Referring to FIG. 10, a functional circuit 500 included in the semiconductor device requires a substrate potential VBB which is a negative voltage, and must generate a negative voltage internally if no negative voltage is supplied from the outside of the semiconductor device. Therefore, the semiconductor device includes a negative potential generation circuit 504 outputting substrate potential VBB which is a negative voltage, and a substrate potential detection circuit 502 receiving substrate potential VBB, determining whether or not a generated potential is appropriate, and controlling negative potential generation circuit 504. A charge pump circuit or the like is employed as negative potential generation circuit 504.

FIG. 11 is a circuit diagram showing a first configuration example of substrate potential detection circuit 502 shown in FIG. 10.

Referring to FIG. 11, substrate potential detection circuit 502 includes an intermediate potential generation circuit 572 receiving substrate potential VBB and outputting a divided potential which is an intermediate potential between a power supply potential VDD and a ground potential, and an inverter 574 receiving the output of intermediate potential generation circuit 572, determining whether the output is higher or lower than an inversion threshold value, and outputting a control signal /EN.

Intermediate potential generation circuit 572 includes a P-channel MOS transistor 576 having a source and a back gate coupled to power supply potential VDD, a drain connected to a node N50 and a gate connected to a ground node, and a P-channel MOS transistor 578 having a source and a back gate connected to node N50, a drain connected to a ground node and a gate receiving substrate potential VBB. A divided potential, which is an intermediate potential between power supply potential VDD and the ground potential, is outputted from node N50.

Inverter 574 includes a P-channel MOS transistor 580 having a source and a back gate coupled to power supply potential VDD, a drain connected to a node N51 and a gate connected to node N50, and a N-channel MOS transistor 582 which is connected between node N51 and a ground node and which has a gate connected to node N50. Control signal /EN is outputted from node N51.

FIG. 12 shows the relationship between substrate potential VBB inputted into intermediate potential generation circuit 572 and the divided potential outputted from node N50.

Referring to FIGS. 11 and 12, if P-channel MOS transistors 576 and 578 have the same electrical characteristic and the following relationship is satisfied, the bias conditions of P-channel MOS transistors 576 and 578 become equal to each other:

$$VBB = -(\tfrac{1}{2}) \times VDD.$$

If the bias conditions of P-channel MOS transistors 576 and 578 become equal to each other, the power supply voltage is divided by these transistors into two. Then, the divided potential outputted from node N50 becomes $(\tfrac{1}{2}) \times VDD$.

Further, if the following relationship is satisfied, the divided potential is lower than $(\tfrac{1}{2}) \times VDD$:

$$VBB < -(\tfrac{1}{2}) \times VDD.$$

On the other hand, if the following relationship is satisfied, the divided potential is higher than $(\tfrac{1}{2}) \times VDD$:

$$VBB > -(\tfrac{1}{2}) \times VDD.$$

FIG. 13 shows the input/output characteristics of inverter 574 shown in FIG. 11.

Referring to FIGS. 11 and 13, inverter 574 outputs "H" logic if an input voltage is lower than a logic threshold value, and outputs "L" logic if the input voltage is higher than the logic threshold value.

The logic threshold value of inverter 574 is set at $(\tfrac{1}{2}) \times VDD$. Then, substrate potential detection circuit 502 outputs "H" if the following relationship is satisfied:

$$VBB < -(\tfrac{1}{2}) \times VDD.$$

On the other hand, substrate potential detection circuit 502 outputs "L" if the following relationship is satisfied:

$$VBB > -(\tfrac{1}{2}) \times VDD.$$

That is, by setting the electrical characteristics of P-channel MOS transistors 576 and 578 equal to each other and selecting $(\tfrac{1}{2}) \times VDD$ as the logic threshold value of inverter 574, substrate potential detection circuit 502 changes an output at a point at which inputted substrate potential VBB coincides with $-(\tfrac{1}{2}) \times VDD$. The potential at this point will be referred to as detected potential.

There is a case where a potential other than $-(\tfrac{1}{2}) \times VDD$ is to be set as the detected potential in the conventional substrate potential detection circuit shown in FIG. 11. In this case, two methods may be considered. First, if substrate potential VBB becomes a desired value by intentionally setting the electrical characteristic of P-channel MOS transistor 576 and that of P-channel MOS transistor 578 different from each other, a divided potential outputted from node N50 is made equal to $(\tfrac{1}{2}) \times VDD$. Second, the logic threshold value of inverter 574 is changed from $(\tfrac{1}{2}) \times VDD$.

To set the electrical characteristic of P-channel MOS transistor 576 and that of P-channel MOS transistor 578 different from each other, such measures as to change the threshold voltage Vth of the P-channel MOS transistors or the resistance value of the channel parts thereof may be taken. However, if the electrical characteristics of transistors are changed by a change in manufacturing conditions or the like, the electrical characteristics of transistors cannot be set different from each other as desired and a desired divided potential cannot be obtained.

Moreover, if the logic threshold value of inverter 574 is changed, the following disadvantage arises. The logic threshold value of an inverter is determined according to the characteristics of both a pull-up element and a pull-down element. Due to this, in a complementary (CMOS) semiconductor device constituted so that a pull-up side is formed by a P-channel MOS transistor and a pull-down side is formed by an N-channel MOS transistor, if the complementary characteristics of the P-channel MOS transistor and the N-channel MOS transistor are changed by a change in manufacturing conditions or the like, a desired logic threshold cannot be obtained.

Under these two circumstances, the conventional art shown in FIG. 11 has a disadvantage in that a desired detected voltage cannot be stably obtained if an arbitrary potential is selected as a substrate potential.

FIG. 14 is a circuit diagram showing a configuration of a substrate potential detection circuit 502a as a second configuration example.

Referring to FIG. 14, substrate potential detection circuit 502a includes a voltage determination circuit 574a in place of inverter 574 in the configuration of substrate potential detection circuit 502 shown in FIG. 11.

Voltage determination circuit 574a includes a reference potential output circuit 586 outputting a reference potential which is a half of power supply potential VDD, and a comparison circuit 588 comparing the output of reference potential output circuit 586 with that of intermediate potential generation circuit 571 and outputting a control signal EN.

Reference potential output circuit 586 includes a P-channel MOS transistor 590 having a source and a back gate connected to power supply potential VDD and a drain and a gate connected to a node N52, and a P-channel MOS transistor 592 having a source and a back gate connected to node N52 and a gate and a drain connected to a ground node. The positive input node of comparison circuit 588 is connected to node N50 and the negative input node of comparison circuit 588 is connected to node N52.

FIG. 15 shows the input/output characteristics of comparison circuit 588.

Referring to FIGS. 14 and 15, comparison circuit 588 amplifies the difference between a potential applied to the positive input node and a potential applied to the negative input node, and outputs the amplified potential difference. The potential applied to the negative input node acts as the logic threshold value of inverter 574 in the conventional art shown in FIG. 11.

The potential inputted into the negative input node is (½)×VDD. If the potential inputted into the positive input node is lower than (½)×VDD, comparison circuit 588 outputs "L" logic. On the other hand, if the potential inputted into the positive input node is higher than (½)×VDD, comparison circuit 588 outputs "H" logic.

That is, substrate potential detection circuit 502a outputs "L" logic if the following relationship is satisfied:

VBB<−(½)×VDD.

Substrate potential detection circuit 502a outputs "H" logic if the following relationship is satisfied:

VBB>−(½)×VDD.

In other words, the detected potential of substrate potential detection circuit 502a is −(½)×VDD.

If a substrate potential other than −(½)×VDD is to be detected using substrate potential detection circuit 502a, the problem of the adjustment of the logic threshold value of the inverter that arises to substrate potential detection circuit 502 does not generate. This is because a logic determination is made based on the potential which is applied to the negative input node of comparison circuit 588 and which generates analogically.

Nevertheless, the disadvantage which arises to intermediate potential generation circuit 572 because a divided potential other than (½)×VDD is obtained, remains unsolved as in the case of the circuit shown in FIG. 11. That is, if the electrical characteristics of transistors are changed by a change in manufacturing conditions or the like, a desired divided potential cannot be obtained.

SUMMARY OF THE INVENTION

An object of the present invention is to provide a semiconductor device capable of stably detecting a desired substrate potential if the substrate potential other than −(½)×VDD is detected.

In short, the present invention provides a semiconductor device internally generating a negative substrate potential, including a first reference potential generation circuit, an intermediate potential generation circuit, a determination circuit and a negative potential generation circuit.

The first reference potential generation circuit generates a first reference potential higher than a target potential of the substrate potential by a half of a potential difference between a power supply potential and a ground potential. The intermediate potential generation circuit receives the substrate potential, and outputs a divided potential which is an intermediate potential between the power supply potential and the ground potential.

The intermediate potential generation circuit includes first and second P-channel MOS transistors. The first P-channel MOS transistor has a source coupled to the power supply potential, a gate receiving the reference potential, and a drain outputting the intermediate potential. The second P-channel MOS transistor is connected between the drain of the first P-channel MOS transistor and a ground node applied with the ground potential, and has a gate receiving the substrate potential.

The determination circuit receives the intermediate potential, and determines whether the substrate potential is higher or lower than the target potential. The negative potential generation circuit drives the substrate potential in a negative potential direction in accordance with an output of the determination circuit.

According to another aspect of the present invention, a semiconductor device internally generating a negative substrate potential, includes an intermediate potential generation circuit, a determination circuit, and a negative potential generation circuit.

The intermediate potential generation circuit receives the substrate potential, and outputs an intermediate potential between a power supply potential and a ground potential.

The intermediate potential generation circuit includes first to third P-channel MOS transistors.

The first P-channel MOS transistor has a source connected to a power supply node applied with the power supply potential, and a drain outputting the intermediate potential. The second P-channel MOS transistor has a source connected to the drain of the first P-channel MOS transistor, a gate connected to a ground node applied with the ground potential, and a drain connected to a gate of the first P-channel MOS transistor. The third P-channel MOS transistor is connected between the drain of the second P-channel MOS transistor and the ground node, and has a gate receiving the substrate potential.

The determination circuit receives the intermediate potential, and determines whether the substrate potential is higher or lower than a target potential of the substrate potential. The negative potential generation circuit drives the substrate potential in a negative potential direction in accordance with an output of the determination circuit.

Therefore, a main advantage of the present invention is as follows: the semiconductor device is less influenced by a change in manufacturing conditions and a target substrate potential can be arbitrarily selected.

Another advantage of the present invention is as follows: the semiconductor device is less influenced by a change in manufacturing conditions and $-(\frac{1}{3})$ times as high as a power supply potential can be selected as a target substrate potential while suppressing a circuit size to be small.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a circuit diagram showing a configuration of a VBB control circuit 34a;

DESCRIPTION OF THE PREFERRED EMBODIMENTS

Hereinafter, embodiments of the present invention will be described in detail with reference to the drawings. It is noted that the same reference symbols denote the same or corresponding sections, respectively.

First Embodiment

Figure 1:
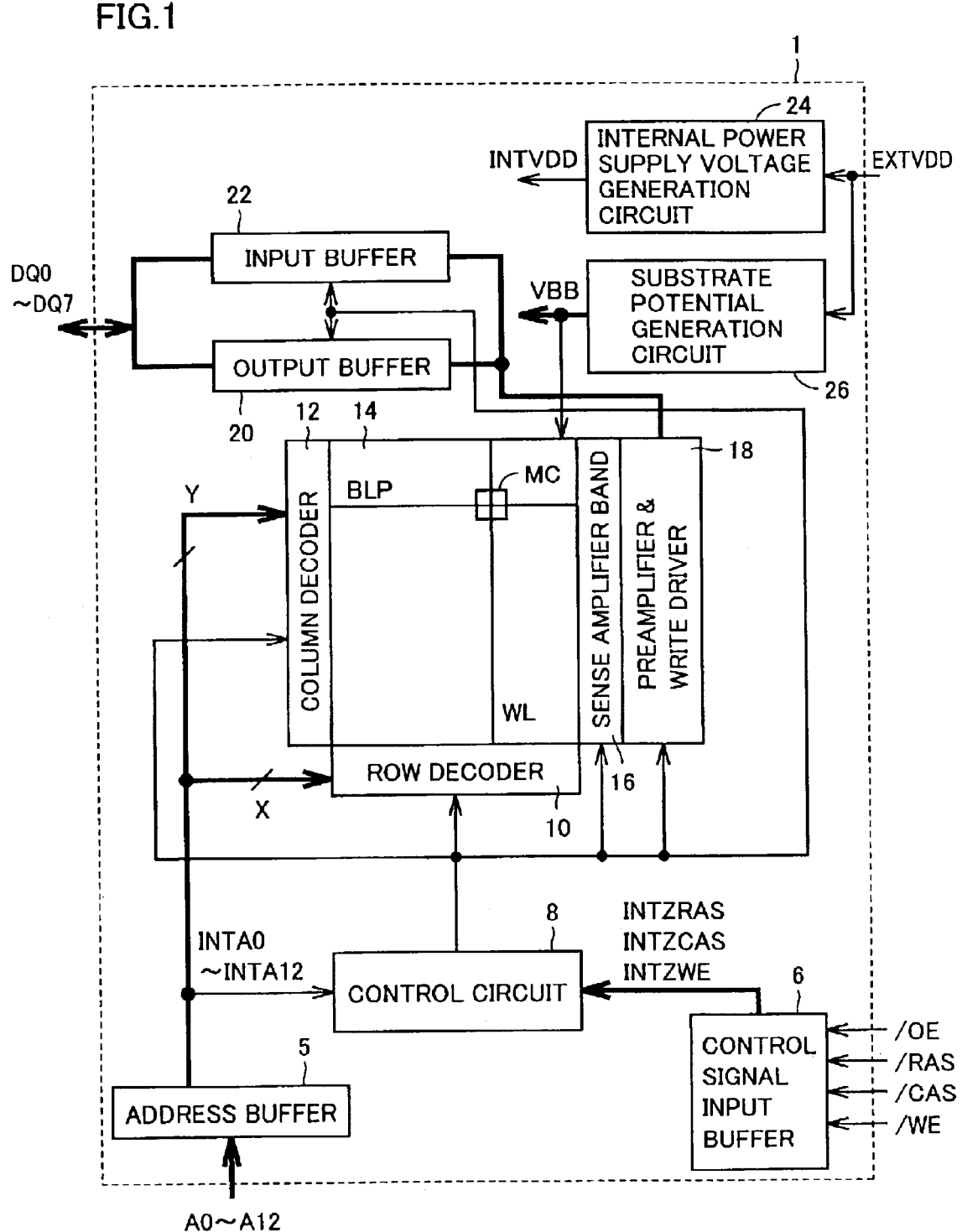
FIG. 1 is a schematic block diagram showing a configuration of a semiconductor device according to a first embodiment of the present invention.

FIG. 1 is a schematic block diagram showing a configuration of a semiconductor device 1 according to a first embodiment of the present invention. In this specification, a case of applying the present invention to a semiconductor memory device as one example of a semiconductor device which requires a substrate potential. However, the present invention is not limited to the semiconductor memory device but may be applied to any semiconductor device which requires a substrate potential.

Referring to FIG. 1, semiconductor device 1 includes a memory cell array 14 having a plurality of memory cells arranged in a matrix, an address buffer 5 receiving address signals A0 to A12 and outputting an internal row address X and an internal column address Y, and a control signal input buffer 6 incorporating control signals /OE, /RAS, /CAS and /WE and outputting internal control signals INTZRAS, INTZCAS and INTZWE.

Memory cell array 14 includes memory cells MC arranged in a matrix, a plurality of word lines WL provided in correspondence with rows of memory cells MC, respectively, and a plurality of bit line pairs BLP provided in correspondence with columns of memory cells MC, respectively. In FIG. 1, one memory cell MC, one word line WL and one bit line pair BLP are typically shown.

Semiconductor device 1 further includes a control circuit 8 receiving the internal address signal from address buffer 5, receiving internal control signals INTZRAS, INTZCAS and INTZWE from control signal input buffer 6, and outputting the control signals to respective blocks.

Control circuit 8 includes a circuit receiving internal control signals INTZRAS, INTZCAS and INTZWE, and outputting a signal SO which activates a sense amplifier and an equalization signal BLEQ which activates an equalization circuit in a sense amplifier band.

Semiconductor device 1 also includes a row decoder 10 decoding a row address signal X applied from address buffer 5. Row decoder 10 includes a word driver (not shown) driving an addressed row (word line) in memory cell array 14 into a selected state.

Semiconductor device 1 further includes a column decoder 12 decoding an internal column address Y applied from address buffer 5 and generating a column select signal, and a sense amplifier band 16 in which a plurality of sense amplifiers detecting and amplifying the data of memory cells MC connected to the selected row in memory cell array 14 are arranged.

In addition, semiconductor device 1 includes an input buffer 22 receiving write data from the outside of semiconductor device 1 and generating internal write data, a write driver amplifying the internal write data from input buffer 22 and transmitting the amplified internal write data to the selected memory cells, a preamplifier amplifying the data read from the selected memory cells, and an output buffer 20 buffering the data from this preamplifier and outputting the buffered data to the outside. In FIG. 1, the preamplifier and the write driver are shown as one single block 18.

Semiconductor device 1 further includes an internal power supply potential generation circuit 24 receiving a power supply potential EXTVDD applied from the outside and outputting an internal power supply potential INTVDD, and a substrate potential generation circuit 26 receiving power supply potential EXTVDD and outputting substrate potential VBB. Substrate potential VBB is supplied to memory cell array 14, for example.

Figure 2:
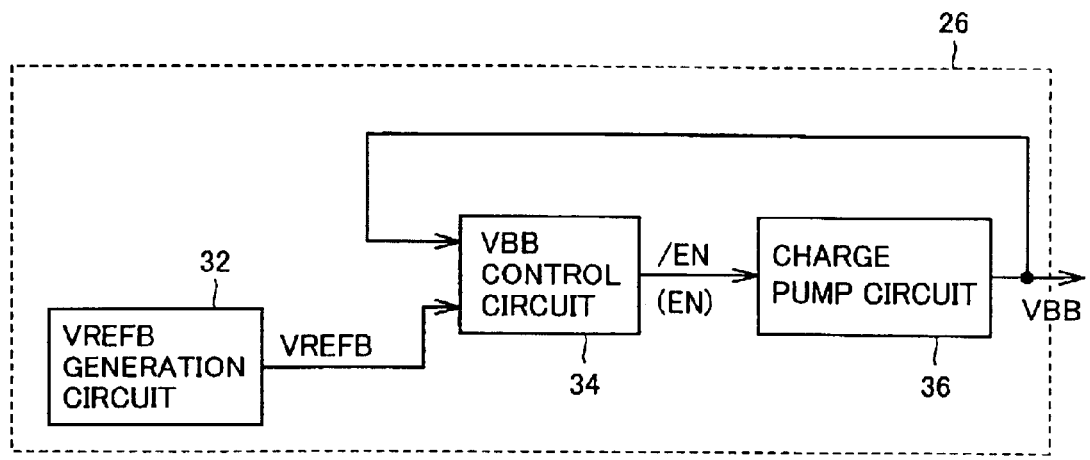
FIG. 2 is a block diagram showing a configuration of a substrate potential generation circuit 26 shown in FIG. 1.

FIG. 2 is a block diagram showing the configuration of substrate potential generation circuit 26 shown in FIG. 1.

Referring to FIG. 2, substrate potential generation circuit 26 includes a VREFB generation circuit 32 outputting a reference potential VREFB, a VBB control circuit 34 receiving substrate potential VBB and reference potential VREFB and outputting a control signal/EN or a control signal EN, and a charge pump 36 which is activated/deactivated according to the output of VBB control circuit 34 and drives substrate potential VBB in a negative potential direction.

Figure 3:
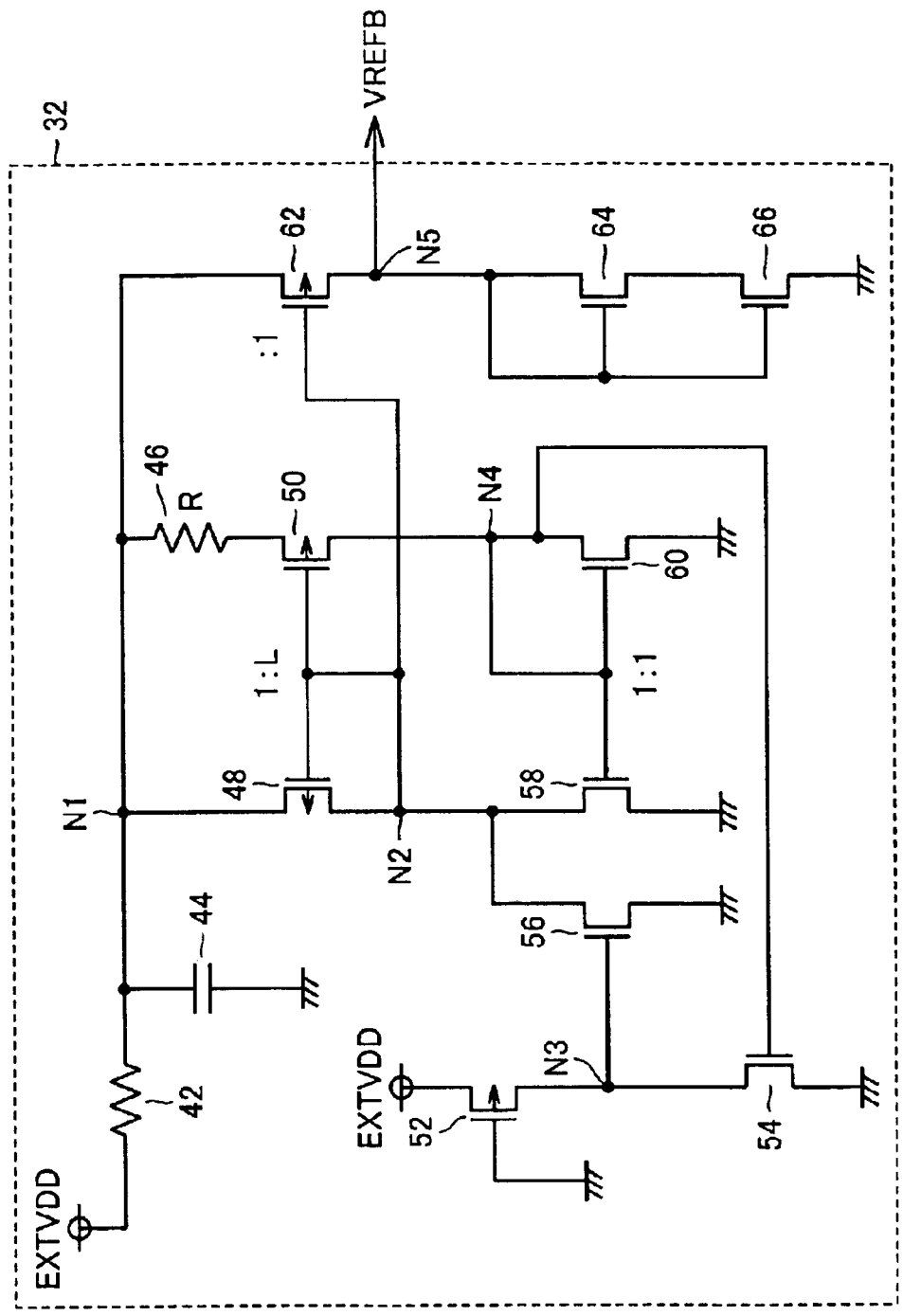
FIG. 3 is a circuit diagram showing a configuration of a VREFB generation circuit 32 shown in FIG. 2.

FIG. 3 is a circuit diagram showing the configuration of VREFB generation circuit 32 shown in FIG. 2.

Referring to FIG. 3, VREFB generation circuit 32 includes a resistance 42 connected between a power supply node applied with power supply potential EXTVDD and a node N1, a capacitor 144 connected between node N1 and a ground node, a P-channel MOS transistor 48 having a source connected to node N1 and having a gate and a drain connected to a node N2, and a resistance 46 and a P-channel MOS transistor 50 which are connected in series between nodes N1 and N4. The gate of P-channel MOS transistor 50 is connected to node N2.

VREFB generation circuit 32 also includes a P-channel MOS transistor 52 which is connected between a node applied with power supply potential EXTVDD and a node N3 and which has a gate connected to a ground node, an N-channel MOS transistor 54 which is connected between node N3 and a ground node and which has a gate connected to node N4, an N-channel MOS transistor 56 which is connected between node N2 and a ground node and which has a gate connected to node N3, an N-channel MOS transistor 58 which is connected between node N2 and a ground node and which has a gate connected to node N4, and an N-channel MOS transistor 60 having a drain and a gate connected to node N4 and having a source connected to a ground node.

VREFB generation circuit 32 further includes a P-channel MOS transistor 62 which is connected between nodes N1 and N5 and which has a gate connected to node N2, and N-channel MOS transistors 64 and 66 which are connected in series between node N5 and a ground node and which have gates connected to node N5, respectively. Reference potential VREFB is outputted from node N5.

Figure 4:
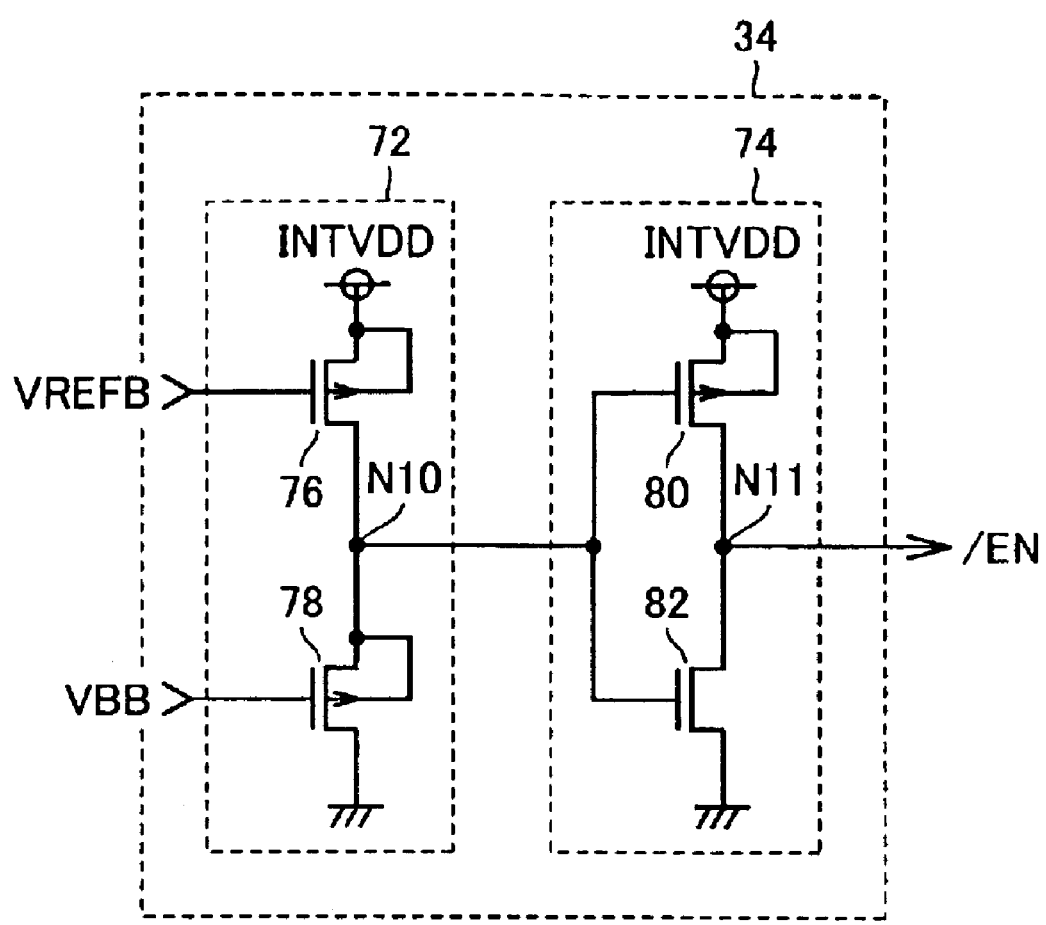
FIG. 4 is a circuit diagram showing a configuration of a VBB control circuit 34 shown in FIG. 2.

FIG. 4 is a circuit diagram showing the configuration of VBB control circuit 34 shown in FIG. 2.

Referring to FIG. 4, VBB control circuit 34 includes an intermediate potential generation circuit 72 receiving reference potential VREFB and substrate potential VBB and outputting an intermediate potential between power supply potential INTVDD and a ground node, and an inverter 74 receiving the output of intermediate potential generation circuit 72, comparing the output thereof with a predetermined logic threshold value, and outputting control signal/EN.

Intermediate potential generation circuit 72 includes a P-channel MOS transistor 76 having a source and a back gate coupled to power supply potential INTVDD, a gate receiving reference potential VREFB and a drain connected to a node N10, and a P-channel MOS transistor 78 having a source and a back gate connected to node N10, a gate receiving substrate potential VBB and a drain connected to the ground node.

Inverter 74 includes a P-channel MOS transistor 80 having a source and a back gate connected to a node applied with power supply potential INTVDD, a drain connected to a node N11 and a gate connected to node N 10, and a P-channel MOS transistor 82 which is connected between node N11 and a ground node and which has a gate connected to node N10. Control signal/EN is outputted from node N11.

Intermediate potential generation circuit 72 has a feature that the electrical characteristics of P-channel MOS transistors 76 and 78 are set equal to each other and that reference potential VREFB which is different from a ground potential is applied to the gate of P-channel MOS transistor 76.

Hereinafter, the operation of intermediate potential generation circuit 72 will be described.

Since P-channel MOS transistors 76 and 78 are equal in electrical characteristics, if the following relationship is satisfied, (½)×VDD is outputted from node N10 as a divided potential:

VBB=VREFB−(½)×VDD.

If the following relationship is satisfied, the divided potential is lower than (½)×VDD:

VBB<VREFB−(½)×VDD.

If the following relationship is satisfied, the divided potential is higher than (½)×VDD:

VBB>VREFB−(½)×VDD.

Figure 13:
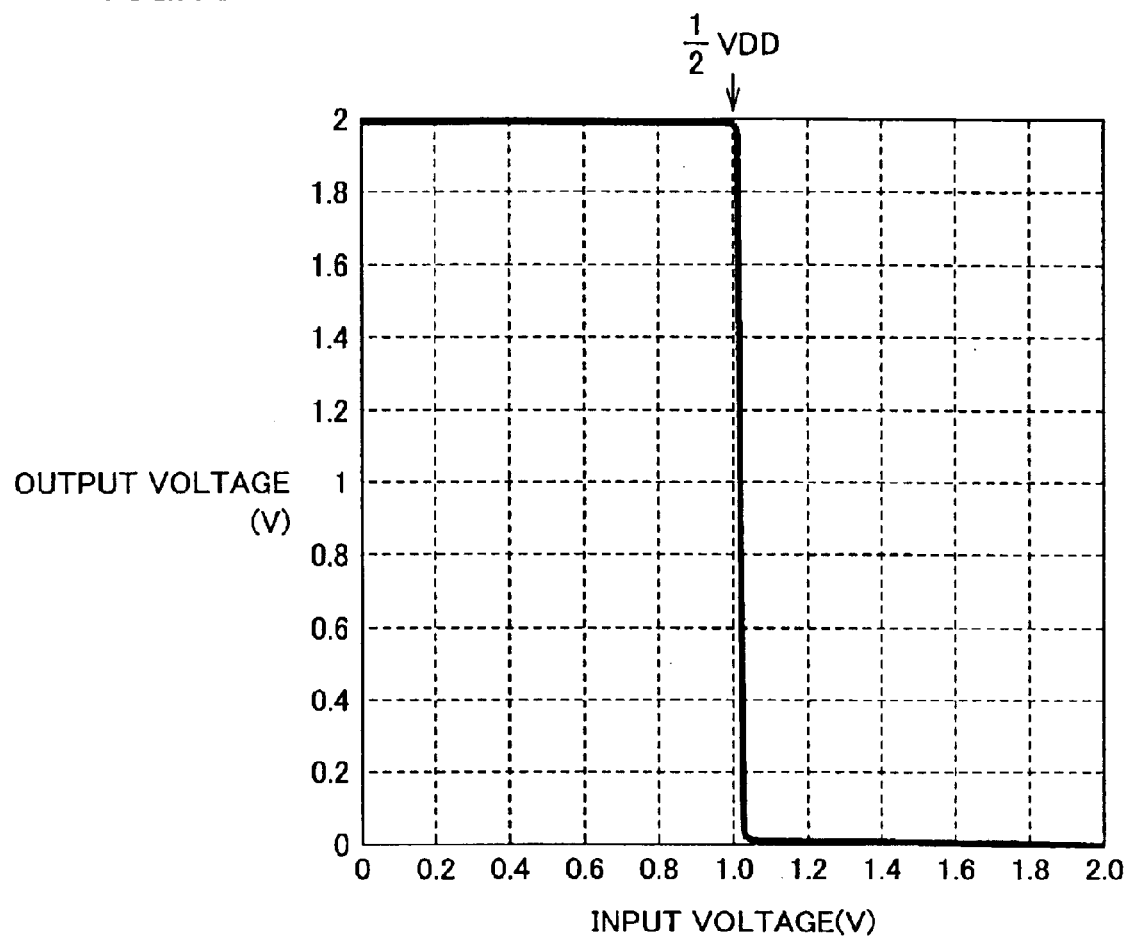
FIG. 13 is a graph showing the input/output characteristics of an inverter 574 shown in FIG. 11.
Figure 14:
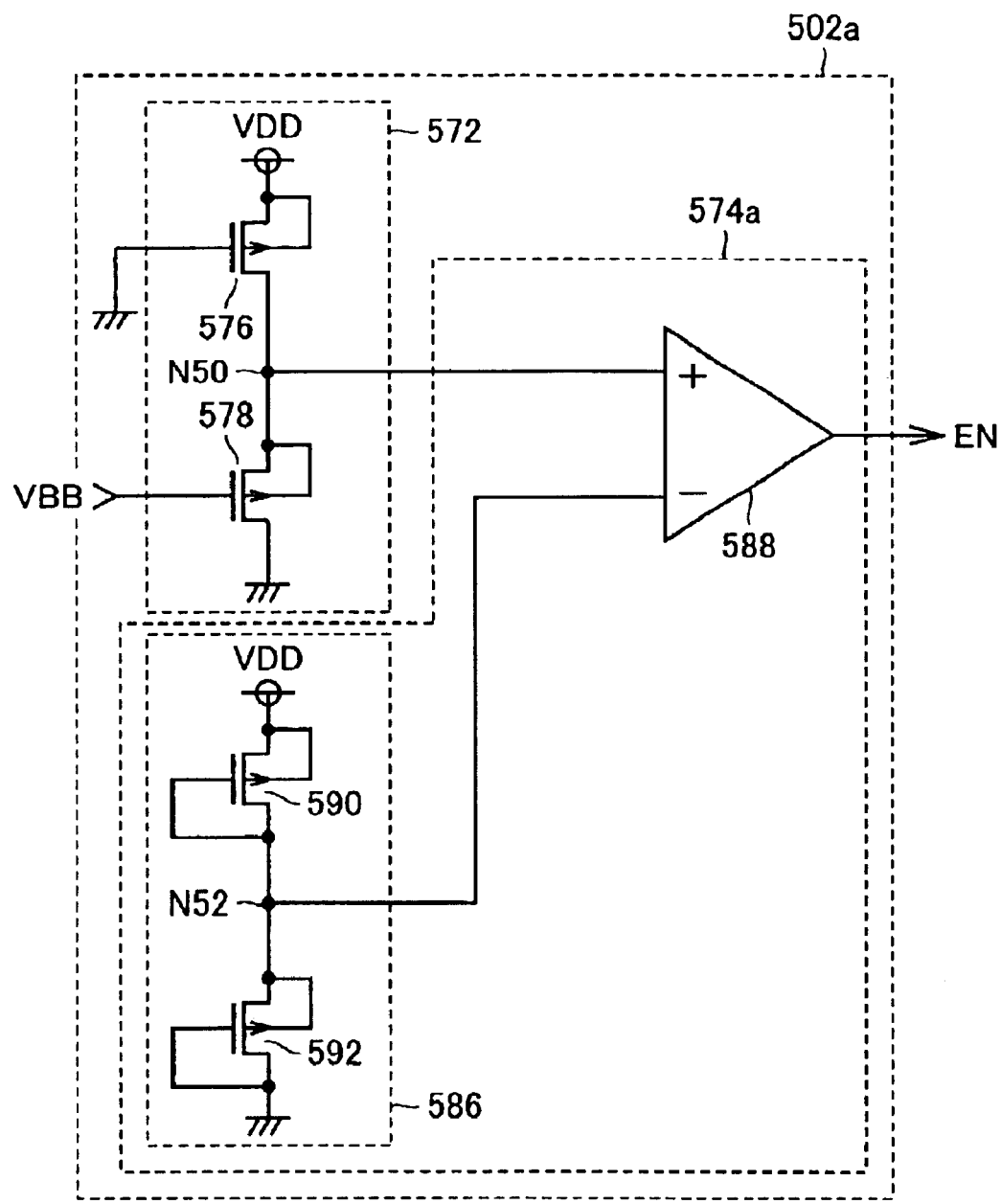
FIG. 14 is a circuit diagram showing a configuration of substrate potential detection circuit 502a as a second configuration example.
Figure 15:
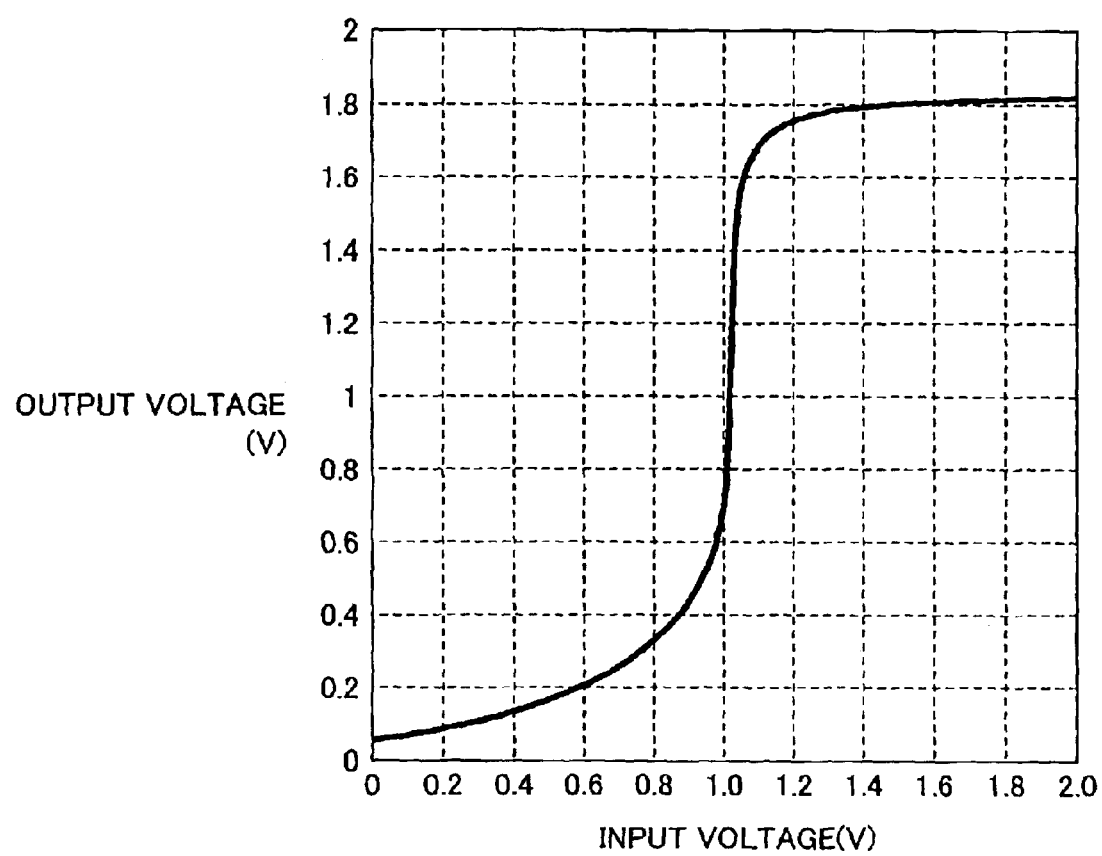
FIG. 15 is a graph showing the input/output characteristics of a comparison circuit 588.

The input/output characteristics of inverter 74 are the same as those shown in FIG. 13. Namely, if the following relationship is satisfied, VBB control circuit 34 outputs "H" logic:

VBB<VREFB−(½)×VDD.

Conversely, if the following relationship is satisfied, VBB control circuit 34 outputs "L" logic:

VBB>VREFB−(½)×VDD.

In other words, the detected potential of VBB control circuit 34 is VREFB−(½)×VDD.

Therefore, if an arbitrary substrate potential is to be detected, reference potential VREFB may be set to satisfy the following relationship:

VBB=VREFB−(½)×VDD.

That is, a reference potential to be applied may be obtained by a value is assigned to VBB to satisfy the relationship:

VREFB=VBB+(½)×VDD.

As a result, P-channel MOS transistors 76 and 78 are equal in bias conditions at the desired detected potential. Thereby, even if the electrical characteristics of transistors are changed by a change in manufacturing conditions or the like, the electrical characteristics of P-channel MOS transistors 76 and 78 which are provided proximate to each other in semiconductor device 1 change similarly, making it possible for internal potential generation circuit 72 to accurately output a divided potential (½)×VDD at the detected potential.

Accordingly, inverter 74 which determines the divided potential outputted from intermediate potential generation circuit 72 with potential (½)×VDD used as a threshold value can accurately determine a detected potential.

As described above, in the first embodiment, it is possible to realize a semiconductor device which can set a substrate potential other than −(½)×VDD as a target substrate potential, which can generate this substrate potential and which is less influenced by a change in manufacturing conditions.

Modification of First Embodiment

Figure 5:
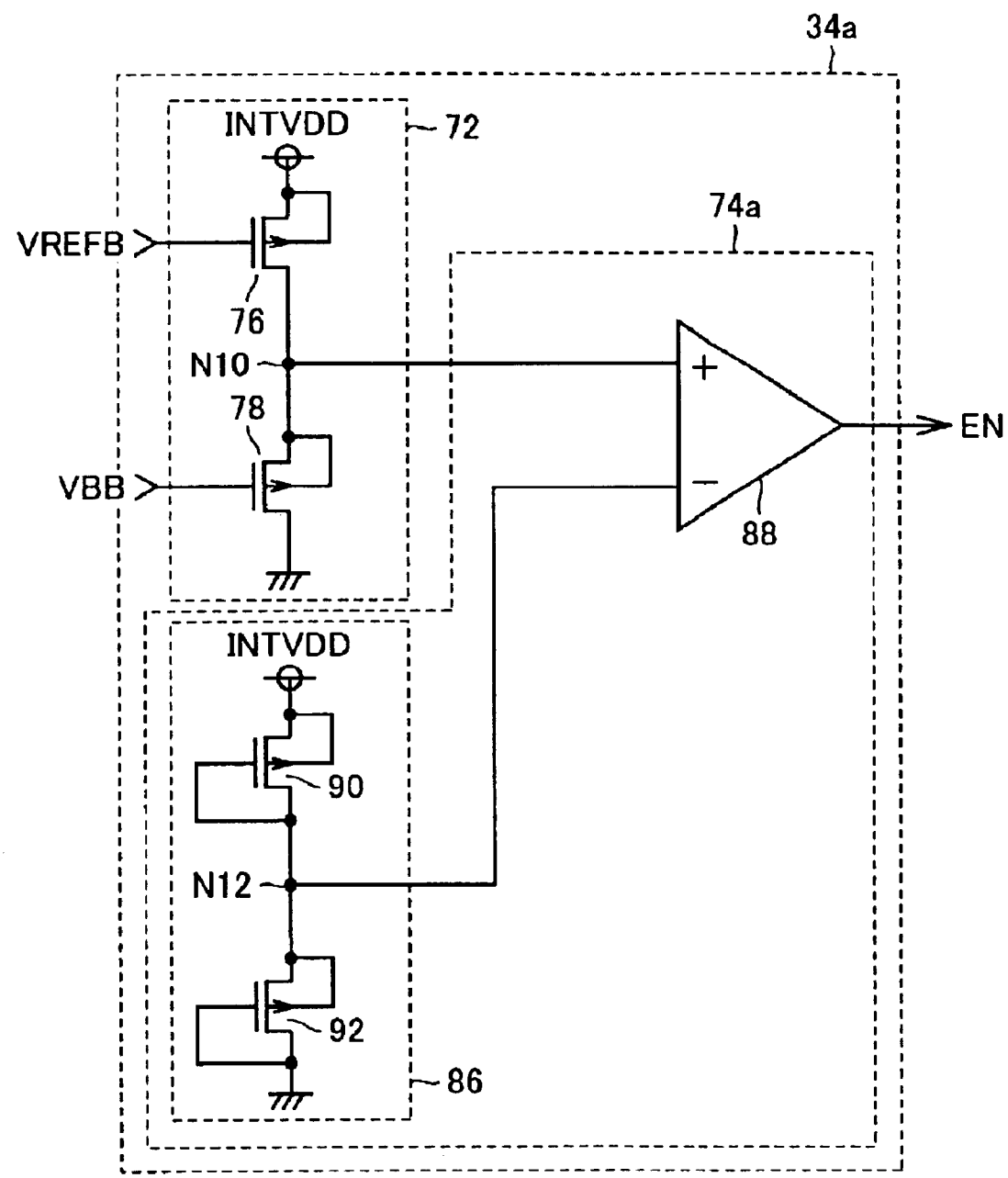

FIG. 5 is a circuit diagram showing a configuration of a VBB control circuit 34a.

Referring to FIG. 5, VBB control circuit 34a includes a voltage determination circuit 74a in place of inverter 74 which is included in the configuration of VBB control circuit 34 shown in FIG. 4.

Voltage determination circuit 74a includes a reference potential generation circuit 86 and a comparison circuit 88.

Reference potential generation circuit 86 includes a P-channel MOS transistor 90 having a back gate and a source connected to a node applied with power supply potential INTVDD and having a gate and a drain connected to a node N12, and a P-channel MOS transistor 92 having a source and a back gate connected to node N12 and having a drain and a gate connected to a ground node.

If the electrical characteristics of P-channel MOS transistors 90 and 92 are set equal to each other, P-channel MOS transistors 90 and 92 are equal in bias conditions. Due to this, (½)×INTVDD is outputted from node N12 as a reference potential. In VBB control circuit 34a, the reference potential applied to the negative input node of comparison circuit 88 corresponds to the logic threshold value of inverter 74 shown in FIG. 4.

Figure 6:
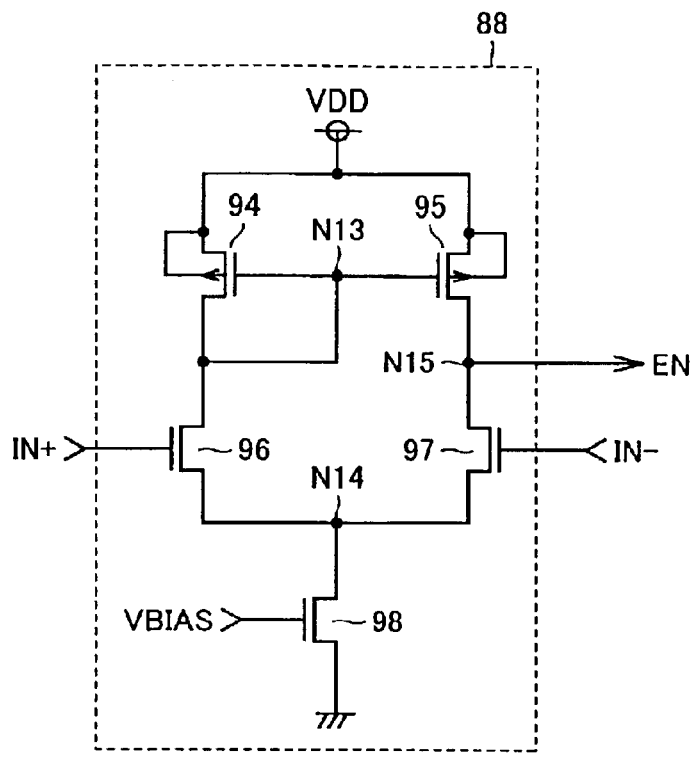
FIG. 6 is a circuit diagram showing a configuration of a comparison circuit 88 shown in FIG. 5.

FIG. 6 is a circuit diagram showing the configuration of comparison circuit 88 shown in FIG. 5.

Referring to FIG. 6, comparison circuit 88 includes a P-channel MOS transistor 94 having a source and a back gate coupled to power supply potential VDD and having a gate and a drain connected to a node N13, a P-channel MOS transistor 95 having a back gate and a source coupled to power supply potential VDD, a gate connected to node N13 and a drain connected to a node N15, an N-channel MOS transistor 96 which is connected between nodes N13 and N14 and which has a gate connected to a positive input node IN+, an N-channel MOS transistor 97 which is connected between nodes N15 and N14 and which has a gate connected to a negative input node IN−, and an N-channel MOS transistor 98 which is connected between node N14 and a ground node and which has a gate receiving a bias potential VBIAS.

Referring back to FIG. 5, the operation of VBB control circuit 34a will be described.

If the potential applied to the negative input node of comparison circuit 88 is (½)×INTVDD and the following relationship is satisfied, VBB control circuit 34a outputs "L" logic:

VBB<VREFB−(½)×INTVDD.

To the contrary, if the potential applied to the negative input node of comparison circuit 88 is (½)×INTVDD and the following relationship is satisfied, VBB control circuit 34a outputs "H" logic:

VBB>VREFB−(½)×INTVDD.

That is, the detected potential of VBB control circuit 34a is VREFB−(½)×VDD.

Even in the modification of the first embodiment as in the case of the first embodiment, reference potential VREFB inputted into the gate of P-channel MOS transistor 76 may be set to satisfy the following relationship so as to detect an arbitrary substrate potential:

VBB=VREFB−(½)×VDD.

As a result, when substrate potential VBB reaches a target potential, a divided potential which is accurately a half of power supply potential INTVDD is outputted from node N10. Further, the potential difference is amplified using comparison circuit 88. Due to this, even if the complementary characteristics of a P-channel MOS transistor and an N-channel MOS transistor are changed by a change in manufacturing conditions or the like, it is possible to set a desired substrate potential.

Second Embodiment

Figure 7:
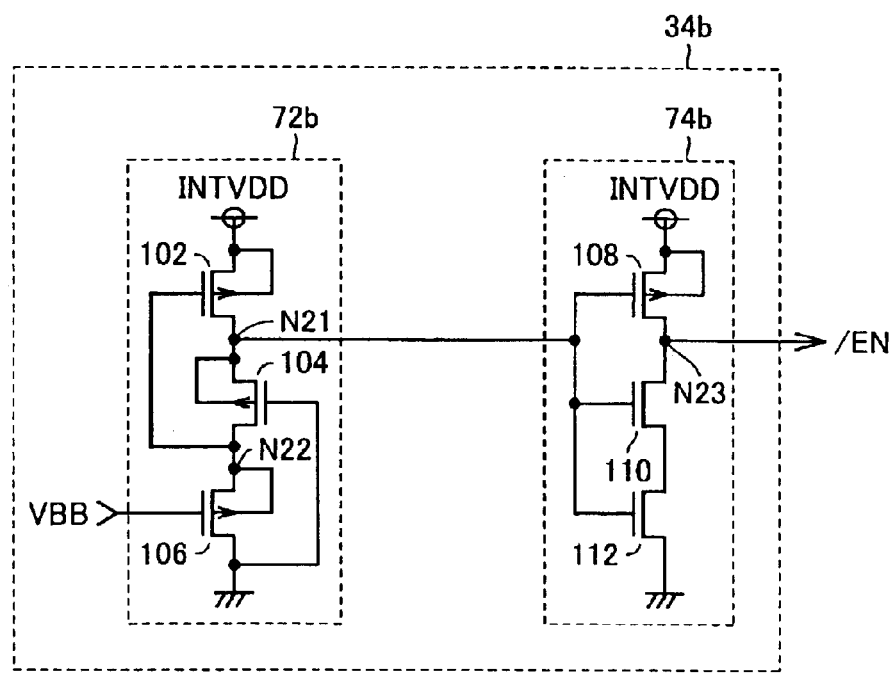
FIG. 7 is a circuit diagram showing a configuration of a VBB control circuit 34b employed in a second embodiment.

FIG. 7 is a circuit diagram showing the configuration of VBB control circuit 34b employed in the second embodiment.

Referring to FIG. 7, VBB control circuit 34 includes intermediate potential generation circuit 72b receiving substrate potential VBB and outputting a divided potential which is an intermediate potential between power supply potential INTVDD and a ground potential, and inverter 74b receiving the output of intermediate potential generation circuit 72b, comparing the output with a logic threshold value and outputting control signal /EN.

Intermediate potential generation circuit 72b includes a P-channel MOS transistor 102 having a source and a back gate coupled to power supply potential INTVDD, a drain connected to a node N21, and a gate connected to a node N22, a P-channel MOS transistor 104 having a source and a back gate connected to node N21, a drain connected to node N22, and a gate connected to a ground node, and a P-channel MOS transistor 106 having a source and a back gate connected to node N22, a drain connected to a ground node, and a gate receiving substrate potential VBB.

Inverter 74b includes a P-channel MOS transistor 108 having a source and a back gate coupled to power supply potential INTVDD, a drain connected to a node N23 and a gate connected to node N21, and N-channel MOS transistors 110 and 112 which are connected in series between node N23 and a ground node. The gates of N-channel MOS transistors 110 and 112 are both connected to node N21. In addition, control signal /EN is outputted from node N23.

Figure 8:
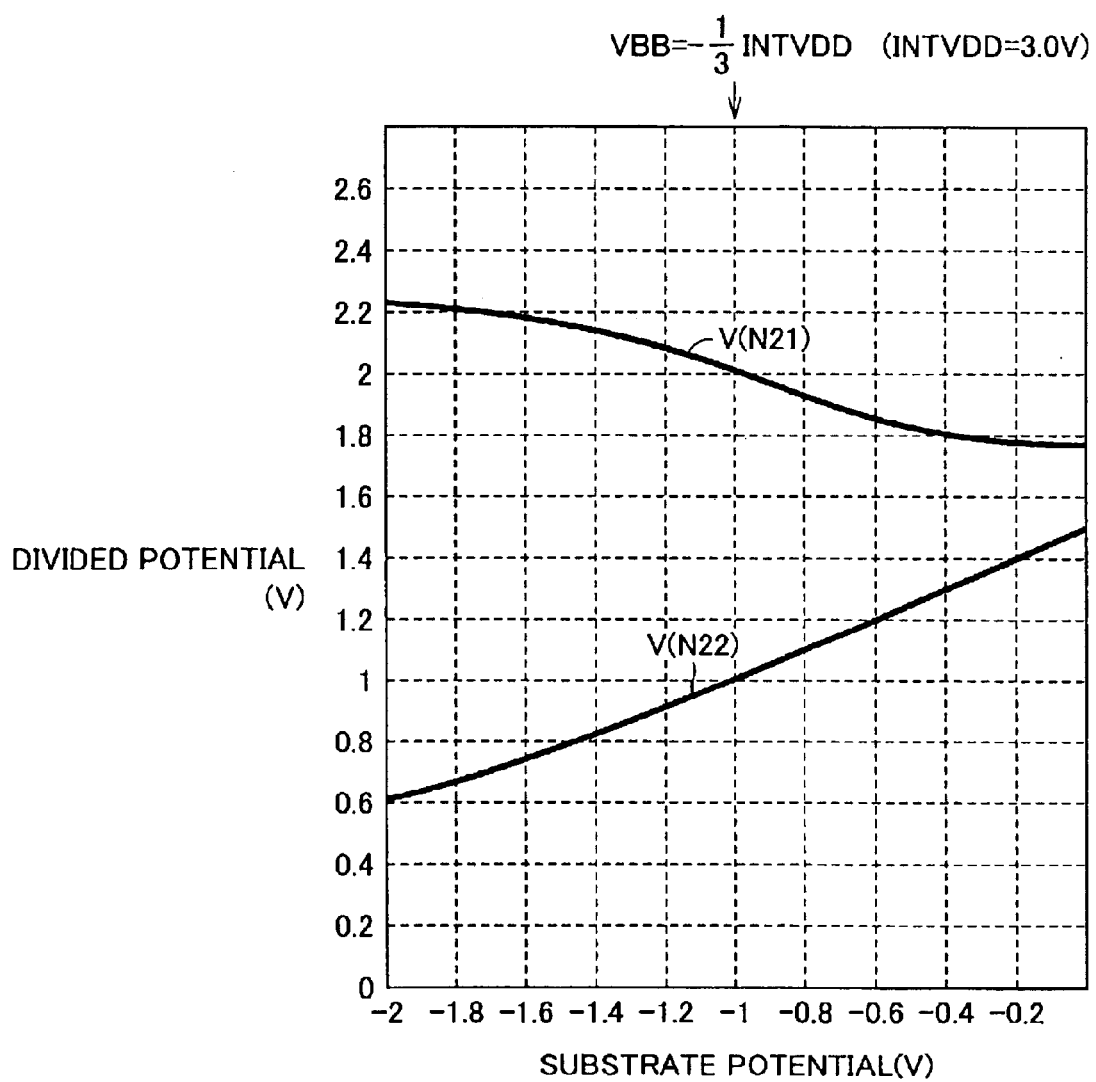
FIG. 8 is a graph for describing a divided potential of an intermediate potential generation circuit 72b shown in FIG. 7.

FIG. 8 is a graph for describing the divided potential of intermediate potential generation circuit 72b shown in FIG. 7.

Referring to FIGS. 7 and 8, if internal power supply potential INTVDD is 3.0 V, substrate potential VBB is −1.0 V. At this time, the potential of node N22 is 1.0 V and that of node N21 is 2.0 V. That is, if substrate potential VBB is −(⅓)×INTVDD, intermediate potential generation circuit 72b divides power supply voltage INTVDD into almost accurately a one-third.

If P-channel MOS transistors 102, 104 and 106 have the same electrical characteristics and the following relationship is satisfied, the three transistors are equal in bias conditions:

VBB=−(⅓)×INTVDD.

If so, power supply potential INTVDD is divided into three, so that (⅔)×INTVDD is outputted from node N21. That is, if the following relationship is satisfied, the divided potential is higher than (⅔)×VDD:

VBB<−(⅓)×VDD.

If the following relationship is satisfied, the divided potential is lower than (⅔)×VDD:

VBB>−(⅓)×VDD.

Here, the logic threshold value of inverter 74b is set at (⅔)×VDD. Therefore, if the divided potential is lower than (⅔)×VDD, inverter 74b outputs "H" logic as control signal /EN. If the divided potential is higher than (⅔)×VDD, inverter 74b outputs "L" logic as control signal /EN.

From the above, VBB control circuit 34b outputs "L" logic if the following relationship is satisfied:

VBB<−(⅓)×VDD.

On the other hand, VBB control circuit 34b outputs "H" logic if the following relationship is satisfied:

VBB>−(⅓)×VDD.

That is, the detected potential of VBB control circuit 34b is −(⅓)×VDD.

In intermediate potential generation circuit 72b, P-channel MOS transistors 102, 104 and 106 are equal in bias conditions at the detected potential. Due to this, intermediate potential generation circuit 72b has the following feature. Even if the electrical characteristics of P-channel MOS transistors 102, 104 and 106 are changed by a change in manufacturing conditions or the like, it is possible to accurately divide power supply potential INTVDD into three at the detected potential as long as this change in electrical characteristic similarly generates to the three transistors and the three transistors are equal in electrical characteristic. Further, unlike the first embodiment, the reference potential generation circuit which outputs VREFB is unnecessary. Due to this, although the detected potential is restricted, circuit scale can be made small.

Modification of Second Embodiment

Figure 9:
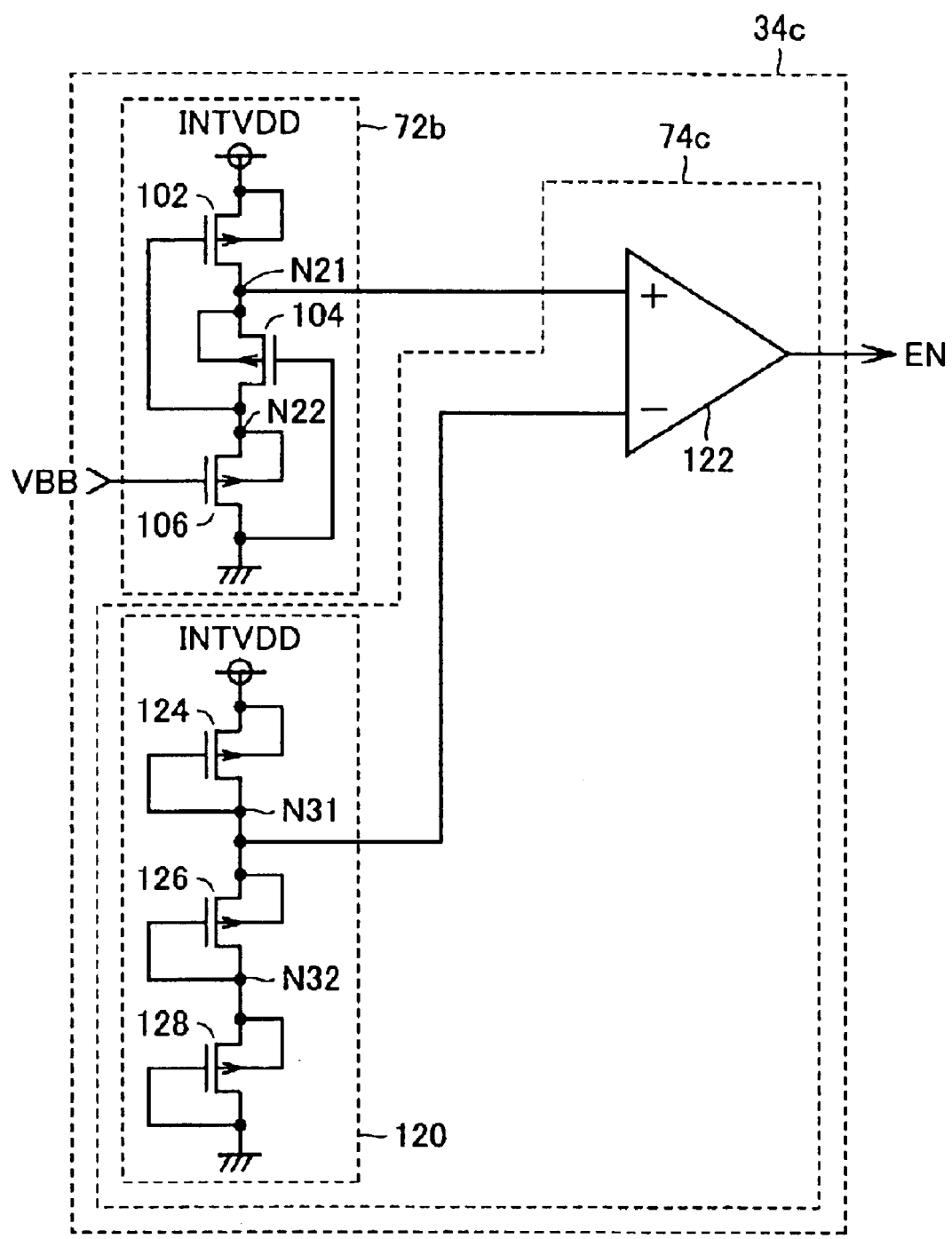
FIG. 9 is a circuit diagram showing a configuration of a VBB control circuit 34c employed in a modification of the second embodiment.
Figure 10:
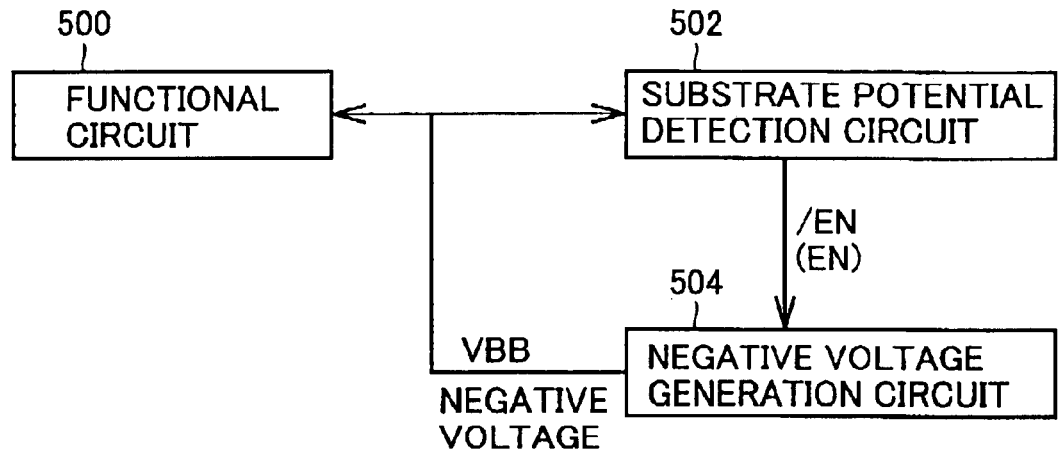
FIG. 10 is a block diagram showing a configuration of a conventional semiconductor device including substrate potential detection circuit 502.
Figure 11:
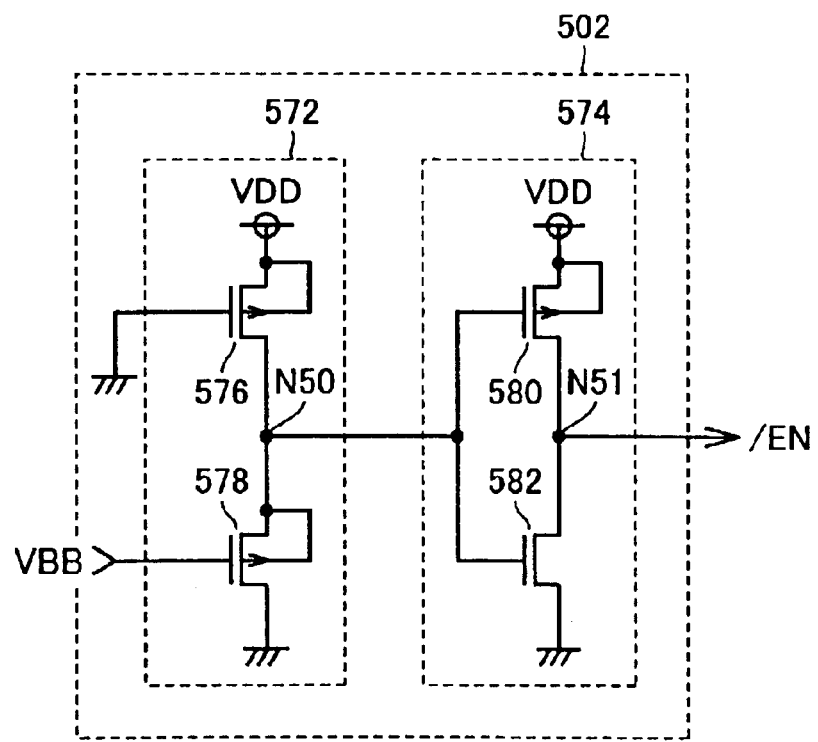
FIG. 11 is a circuit diagram showing a first configuration example of substrate potential detection circuit 502 shown in FIG. 10.
Figure 12:
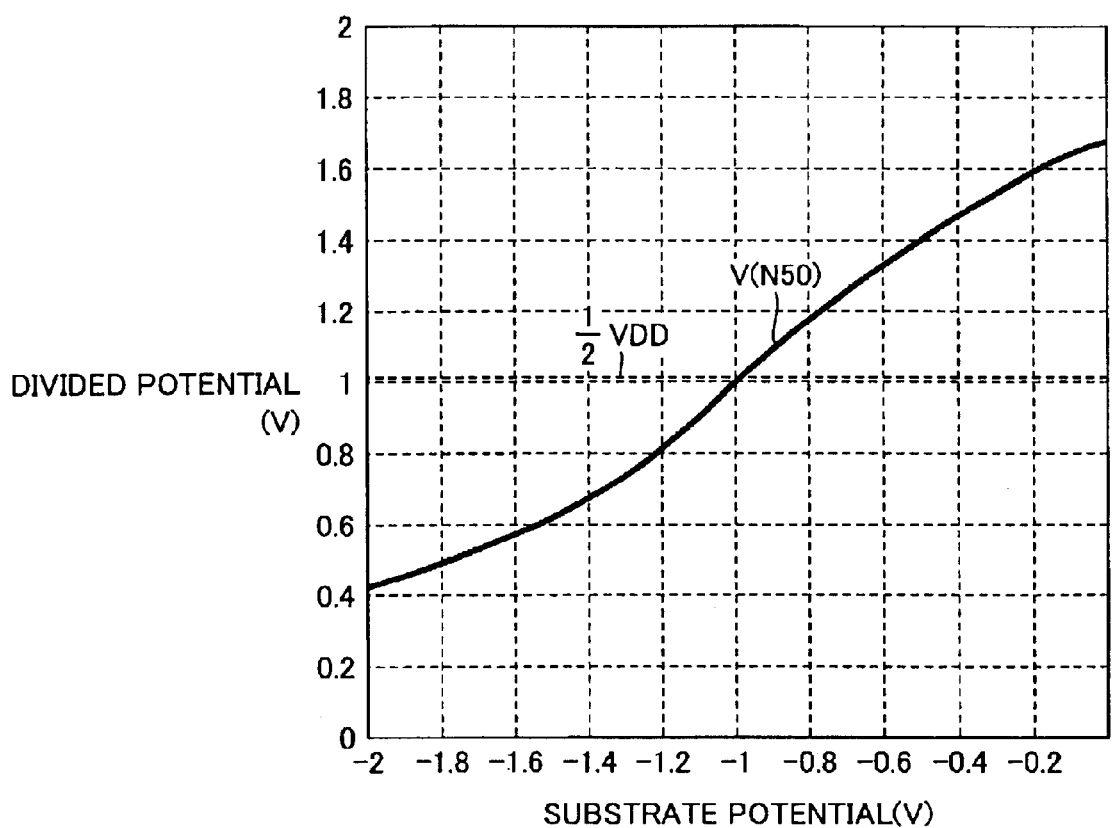
FIG. 12 is a graph showing the relationship between substrate potential VBB inputted into intermediate potential generation circuit 572 and a divided potential outputted from a node N50.

FIG. 9 is a circuit diagram showing the configuration of VBB control circuit 34c employed in the modification of the second embodiment.

Referring to FIG. 9, VBB control circuit 34c includes a voltage determination circuit 74c in place of inverter 74b which is included in the configuration of VBB control circuit 34b shown in FIG. 7.

Voltage determination circuit 74c includes a reference potential generation circuit 120 and a comparison circuit 122.

Reference potential generation circuit 120 includes a P-channel MOS transistor 124 having a back gate and a source coupled to power supply potential INTVDD and having a gate and a drain connected to a node N31, a P-channel MOS transistor 126 having a source and a back gate connected to node N31 and having a drain and a gate connected to a node N32, and a P-channel MOS transistor 128 having a source and a back gate connected to node N32 and having a drain and a gate connected to a ground node.

If the electrical characteristics of P-channel MOS transistors 124, 126 and 128 are set equal to one another, these three transistors are equal in bias conditions. Therefore, the power supply voltage is divided into three equal parts by the three transistors. At this time, (⅔)×INTVDD is outputted from node N31 as a reference potential. In VBB control circuit 34c, the reference potential applied to the negative input node of comparison circuit 122 acts as the logic threshold value of inverter 74b in FIG. 7.

Since comparison circuit 122 has the same configuration as that of comparison circuit 88 described with reference to FIG. 6, it will not be repeatedly described herein.

Next, the operation of VBB control circuit 34c will be described.

If the potential applied to the negative input node of comparison circuit 122 is (⅔)×INTVDD and VBB is −(⅓)×INTVDD which is a detected potential, intermediate potential generation circuit 72b outputs a divided potential (⅔)×INTVDD. Therefore, if the following relationship is satisfied, VBB control circuit 34c outputs "L" logic:

VBB<−(⅓)×INTVDD.

If the following relationship is satisfied, VBB control circuit 34c outputs "H" logic:

VBB>−(⅓)×INTVDD.

Even in the modification of the second embodiment as in the case of the second embodiment, if substrate potential VBB reaches a target potential of −(⅓)×INTVDD, a divided potential which is accurately a two-thirds of power supply voltage INTVDD is outputted from node N21. Further, a potential difference is amplified using comparison circuit 122. Due to this, VBB control circuit 34c has the following feature. Even if the complementary characteristics of the P-channel MOS transistor and the N-channel MOS transistor are changed by a change in manufacturing conditions or the like, it is possible to set a substrate potential as desired.

According to the present invention, it is possible to obtain a highly accurate substrate potential detection circuit by the configuration shown in each of the above-described embodiments.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device internally generating a negative substrate potential, comprising:
    an intermediate potential generation circuit receiving said substrate potential, and outputting an intermediate potential between a power supply potential and a ground potential,
    said intermediate potential generation circuit including
    a first P-channel MOS transistor having a source connected to a power supply node applied with said power supply potential, and a drain outputting said intermediate potential,
    a second P-channel MOS transistor having a source connected to the drain of said first P-channel MOS transistor, a gate connected to a ground node applied with said ground node, and a drain connected to a gate of said first P-channel MOS transistor, and
    a third P-channel MOS transistor connected between the drain of said second P-channel MOS transistor and said ground node, and having a gate receiving said substrate potential;
    a determination circuit receiving said intermediate potential, and determining whether said substrate potential is higher or lower than a target potential of said substrate potential;
    a negative potential generation circuit driving said substrate potential in a negative potential direction in accordance with an output of said determination circuit.

2. The semiconductor device according to claim 1, wherein
    each of said first to third P-channel MOS transistors has a back gate and a source connected to each other.

3. The semiconductor device according to claim 1, wherein
    said determination circuit includes
    an inverter having a logic threshold value which is a two-thirds of the potential difference between said power supply potential and said ground potential, and receiving said intermediate potential.

4. The semiconductor device according to claim 1, wherein
    said determination circuit includes
    a reference potential generation circuit generating a reference potential higher than said ground potential by a two-third of the potential difference between said power supply potential and said ground potential, and
    a comparison circuit comparing said reference potential with said intermediate potential.

* * * * *